(12) United States Patent
Moore

(10) Patent No.: US 9,963,261 B2
(45) Date of Patent: May 8, 2018

(54) REUSABLE FOLDABLE FOOD STORAGE AND SERVING CONTAINER

(71) Applicant: Emily Moore, Sterling, MA (US)

(72) Inventor: Emily Moore, Sterling, MA (US)

( * ) Notice: Subject to any disclaimer, the term of this patent is extended or adjusted under 35 U.S.C. 154(b) by 0 days. days.

(21) Appl. No.: 15/090,135

(22) Filed: Apr. 4, 2016

(65) Prior Publication Data

US 2016/0288956 A1 Oct. 6, 2016

Related U.S. Application Data

(60) Provisional application No. 62/143,297, filed on Apr. 6, 2015.

(51) Int. Cl.
| | | |
|---|---|---|
| *B65D 21/08* | (2006.01) |
| *B65D 81/34* | (2006.01) |
| *B65D 43/16* | (2006.01) |
| *B65D 5/36* | (2006.01) |
| *B65D 5/20* | (2006.01) |

(52) U.S. Cl.
CPC ......... *B65D 5/3642* (2013.01); *B65D 5/2042* (2013.01); *B65D 5/2047* (2013.01); *B65D 5/2057* (2013.01); *B65D 43/162* (2013.01); *B65D 81/3453* (2013.01); *Y02W 30/807* (2015.05)

(58) Field of Classification Search
CPC B65D 21/086; B65D 43/162; B65D 81/3453; B65D 2543/00194; B65D 2543/00296; B65D 5/3642; B65D 5/2042; B65D 5/2047; B65D 5/2057
USPC .......................................... 229/114, 113, 186
See application file for complete search history.

(56) References Cited

U.S. PATENT DOCUMENTS

| | | | | |
|---|---|---|---|---|
| 4,930,639 A | * | 6/1990 | Rigby ................. | B65D 5/5455 229/120 |
| 5,253,802 A | * | 10/1993 | Bernard .............. | B65D 5/3635 229/114 |
| 5,494,214 A | * | 2/1996 | Fleury ................. | B65D 5/6664 229/114 |
| 2004/0182916 A1 | * | 9/2004 | Roseth ................ | B65D 5/2047 229/155 |

* cited by examiner

*Primary Examiner* — Christopher Demeree
(74) *Attorney, Agent, or Firm* — Genius Patent APC; Bruce Hare

(57) ABSTRACT

A foldable food storage container includes a main storage area and a cover and is able to convert from a folded state to an expanded state and vice versa. The main storage area includes a bottom panel, a front panel, a rear panel, a left panel, a right panel, and multiple fold lines. The main storage area is able to store, transport, and serve food. The cover includes one or more flaps and a fastener, which is able to selectively secure the cover to the food storage area when the container is in an expanded state.

11 Claims, 15 Drawing Sheets

REUSABLE FOLDABLE FOOD STORAGE AND SERVING CONTAINER

CROSS-REFERENCE TO RELATED APPLICATIONS

This application claims priority to U.S. Provisional Patent Application Ser. No. 62/143,297, filed on Apr. 6, 2015.

BACKGROUND

Use of portable food storage (or "to-go") containers is ubiquitous in society. Existing products include containers that provide for the storage of food products, but fail to allow a user to easily transport the container.

In addition, existing products may be bulky, may be fixed size, and/or may not be reusable.

Therefore, there exists a need for a food storage and serving container that is foldable and reusable.

SUMMARY

Some embodiments provide a foldable food storage and serving container. The container may include a main storage area able to hold food, liquids, and/or other appropriate items or cargo. In addition, the container may include a cover (or "lid") that may be secured to the top of the container when in an expanded state. The container cover may include one or more tabs and/or a built-in fastener to secure the cover to the main storage area or main body of the container.

The food storage container may be able to convert from a folded state to an expanded state (with lid open or closed) and vice versa. The container may include various foldlines, hinges, and/or rigid sections (or "panels" or "planar sections" or "planar elements") that allow the container to fold into a folded, flattened state. The food storage container may unfold into an expanded state to store, transport, and/or serve food.

The expanded state may include opened and closed substates. The lid may be secured to the front of the container to achieve a closed state, in which the container may be used to safely transport and/or store food. The lid may be released from the front of the container to achieve an open state, in which the container may be used to serve food, and/or food may be placed into or taken out of the container.

The folded or flattened state may allow for easy and convenient transportation of the container when not being used to store or serve food. The container may be sized such that, in a flattened state, the container is able to be placed in a pocket or other small area for transport and safekeeping.

The food storage container may include fixed, adjustable, and/or foldable frames, as well as other structural support elements (such as arches, beams, columns, hinges, etc.). Some embodiments may include features such as a retractable cover, flaps, slide-open doors, drawstrings, folds, etc. Different embodiments may be various different shapes (e.g., rectangles, triangles, hexagons, rounded shapes, etc.) and/or sizes (e.g., the size of a sandwich, lunchbox, pizza, etc.), as appropriate.

The container may include materials such as plastics that are waterproof and dishwasher-safe to allow for easy cleaning and reuse of the container. Such materials may also be heat-resistant and microwave-safe to allow food within the container to be warmed up (e.g., in a microwave oven, conventional oven, etc.). The container may be produced from a single piece of material and/or be formed using injection molding. The panels may be thick enough to support the structure of the container and to hold food and/or liquids in the container during use. The fold lines may be thinner than the panels to allow manipulation of the panels when converting the container from a folded state to an expanded state and vice versa. The frame(s) and structural support elements may be sufficiently rigid to maintain structural integrity of the container.

The preceding Summary is intended to serve as a brief introduction to various features of some exemplary embodiments. Other embodiments may be implemented in other specific forms without departing from the scope of the disclosure.

BRIEF DESCRIPTION OF THE SEVERAL VIEWS OF THE DRAWINGS

The exemplary features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide a foldable food storage and serving container that may unfold into an expanded state to store, transport, and/or serve food, and may fold into a foldable state to provide for convenient transportation when not in use.

Although various examples above and below may refer to the foldable container of some embodiments being used to transport, store, and/or serve "food", one of ordinary skill in the art will recognize that the foldable container may be used with various other items or cargo.

A first exemplary embodiment provides a foldable food storage and serving container that includes a bottom panel, a left side panel coupled to the bottom panel along a left side fold line, a right side panel couple to the bottom panel along a right side fold line, a rear panel coupled to the bottom panel along a back fold line, and a front panel couple to the bottom panel along a front fold line.

A second exemplary embodiment provides a storage and serving container that includes: multiple planar elements; multiple scored fold lines that couple the planar elements together; and a fastening element that selectively couples at least one planar element to at least one other planar element.

A third exemplary embodiment provides foldable food storage container including: a main storage compartment; and a lid.

Figure 1A:
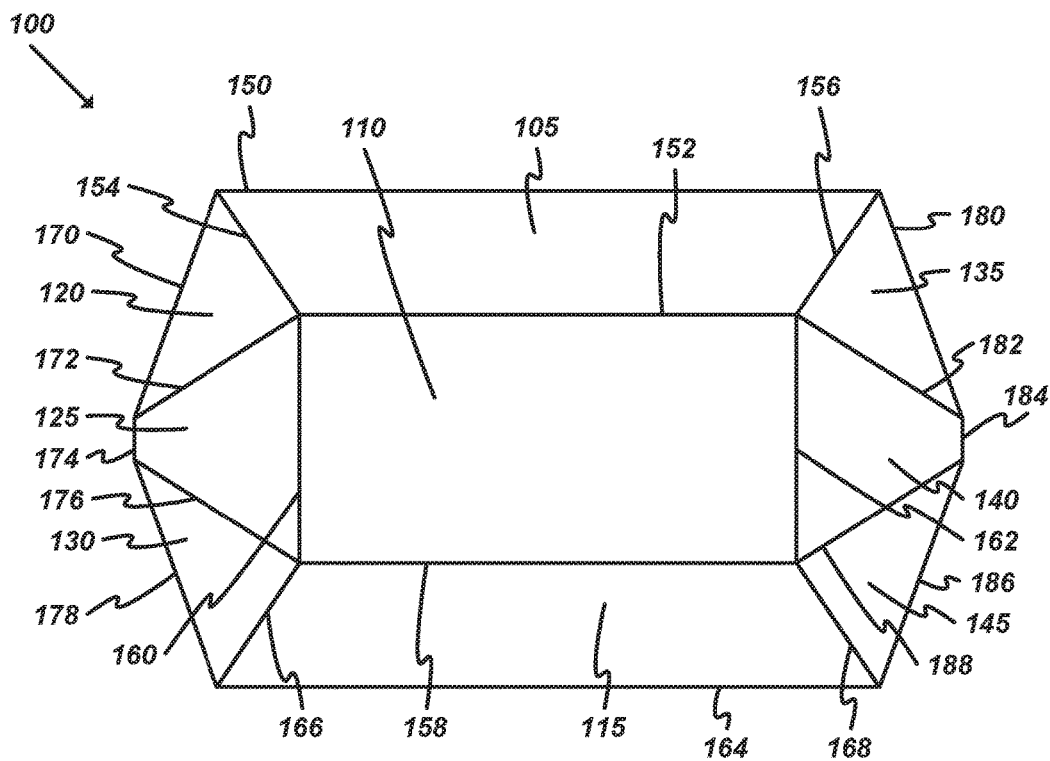
FIG. 1A illustrates a top view of a partially-expanded foldable food storage container according to an exemplary embodiment.
Figure 1B:
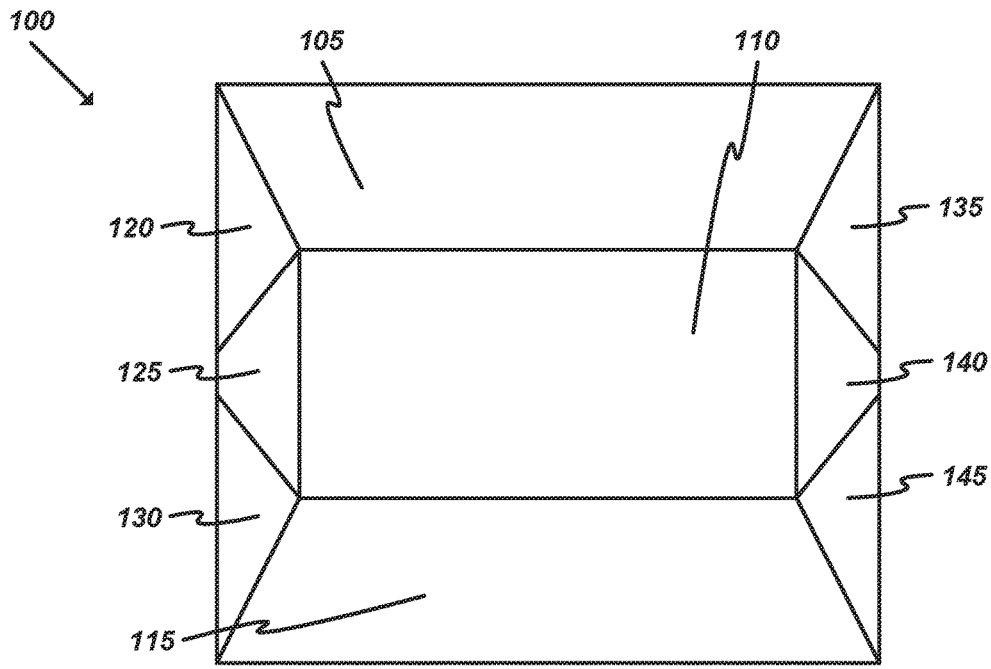
FIG. 1B illustrates a top view of the foldable food storage container of FIG. 1A in a fully expanded state.

FIG. 1A illustrates a top view of a partially-expanded foldable food storage container 100 according to an exemplary embodiment. In this example, the cover is omitted for clarity. The cover is described in greater detail in reference to FIG. 1E below. FIG. 1B illustrates a top view of the fully-expanded foldable food storage container 100. Such containers may have varying lengths, widths, and/or heights, as appropriate for different users and/or uses. For example, the container may be sized relative to a lunchbox, a sandwich, a pizza, various sized meals, etc.

The food storage container may be made of various appropriate materials (e.g., polypropylene, low-density polyethylene (LDPE), other plastics, thermoplastics, etc.) that allow the container to be washable, reusable, and able to withstand temperatures of up to five hundred degrees Fahrenheit.

The size, shape, and/or other attributes of the container may be based at least partly on the needs of various applications. In some embodiments, the container may be constructed in standard sizes (i.e., small, medium, large, extra-large, etc.). The container may be various different shapes (e.g., rectangles, triangles, hexagons, rounded shapes, etc.) for various applications.

The container may include various panels, edges, fold-lines, hinges, and/or rigid sections that allow the container to fold into a folded, flattened state, and unfold into an expanded state. The container may be sized to fit in various pockets, bags, purses, pouches, etc. when in a folded state. The food storage container may include fixed, adjustable, and/or foldable frames, as well as other structural support elements. Some embodiments may include features such as a retractable cover, flaps, slide-open doors, drawstrings, folds, hinges, etc.

As shown in FIGS. 1A-1B, the food storage container 100 may include back panel 105, bottom panel 110, front panel 115, left side panels 120, 125, 130, right side panels 135, 140, 145, and fold lines (or "edges") 150-188. When container 100 is in a fully or partially expanded state, the area defined by back panel 105, bottom panel 110, front panel 115, left side panels 120, 125, and 130, and right side panels 135, 140, and 145 may be used as a food storage area. The food storage area may be able to contain food and/or liquids when in a partially-expanded or fully-expanded state.

The panels 105-145 may be coupled via fold lines 150-188. For example, back panel 105 may attach to bottom panel 0110, left back panel 120, and right back panel 135 via fold lines 152, 154, and 156, respectively.

In some embodiments, the container 100 may be injection molded to include the various panels and hinges. In some embodiments, the container may be made from a sheet of semi-flexible material that is scored to generate "living" hinges within the material itself. Such semi-flexible material may be rigid enough to support a structure bounded by the various panels while the fold lines may be flexible enough to allow movement between the panels along the fold lines.

As shown, the bottom panel 110 may be rectangular in shape, the back panel 105, front panel 115, left middle panel 125, and right middle panel 140 may be trapezoidal in shape, and the left front and back panels 120, 130, and matching right front and back panels 135, 145 are triangular in shape.

This configuration allows the left side panels 120, 125, 130 and right side panels to be folded nearly flat by extending the medial panels 125, 140 out to the sides. Similarly, the inside face of the front panel 115 may be folded nearly flat into the bottom panel 110, and then the outside face of the front panel 115, along with the bottom panel 110, may be folded nearly flat into the back panel 105. The back panel 105 may be the same relative size as the front panel 115, and the left back and front panels 80, 130 may the same relative size as the right back and front panels 135, 145. The panels 105-145, fold lines 150-188, and cover panels and tabs 190-197 may be an appropriate thickness to allow various panels and/or areas of the container to be folded nearly flat on top of each other.

Figure 1C:
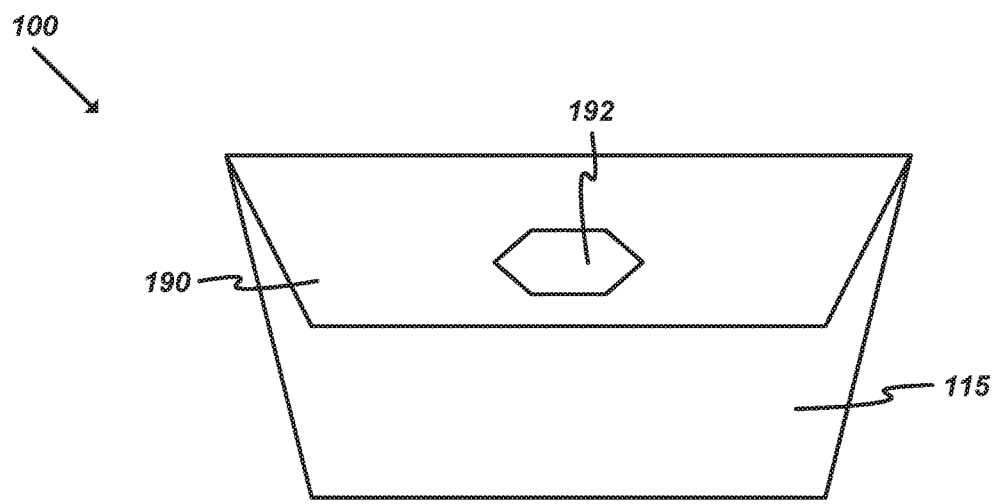
FIG. 1C illustrates a front view of the foldable food storage container of FIG. 1A in a fully-expanded and covered state.

FIG. 1C illustrates a front view of the fully-expanded and covered foldable food storage container 100. As shown, container 100 may include front panel 115, front tab 190, and fastening element 192. The front tab (or "flap") 190 may include a fastening element 192 to secure and/or fasten to a complementary fastening element on the front panel 115 of container 100 when in an expanded state.

Figure 1D:
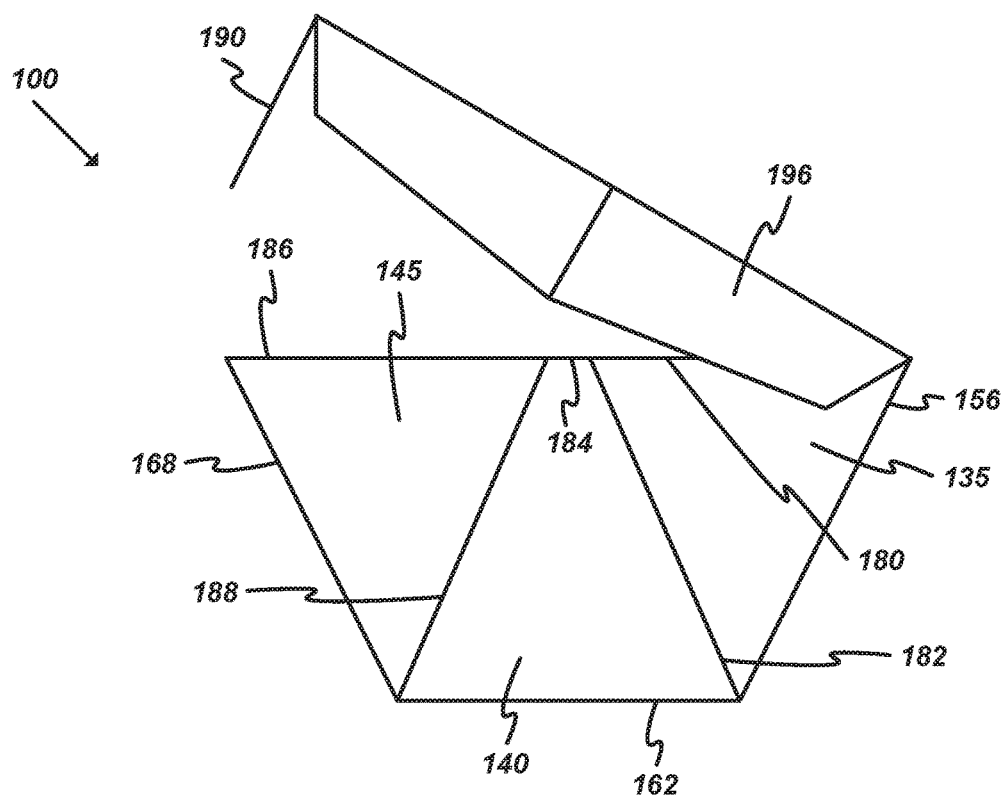
FIG. 1D illustrates a side view of the foldable food storage container of FIG. 1A in a fully-expanded state.

FIG. 1D illustrates a side view of the fully-expanded foldable food storage container 100. As shown, container 100 may include right side panels 135, 140, and 145, fold lines 156, 162, 168, 180, 182, 184, 186, and 188, front tab 190, and right side tab 196. In the fully-expanded state shown in FIG. 1D, edges 180, 184, and 186 may form a single straight edge, which may be a top edge of the food storage area. As shown, the cover is in a partially opened (or partially closed) state, with front tab 190 and right side tab 196 in a folded configuration.

Figure 1E:
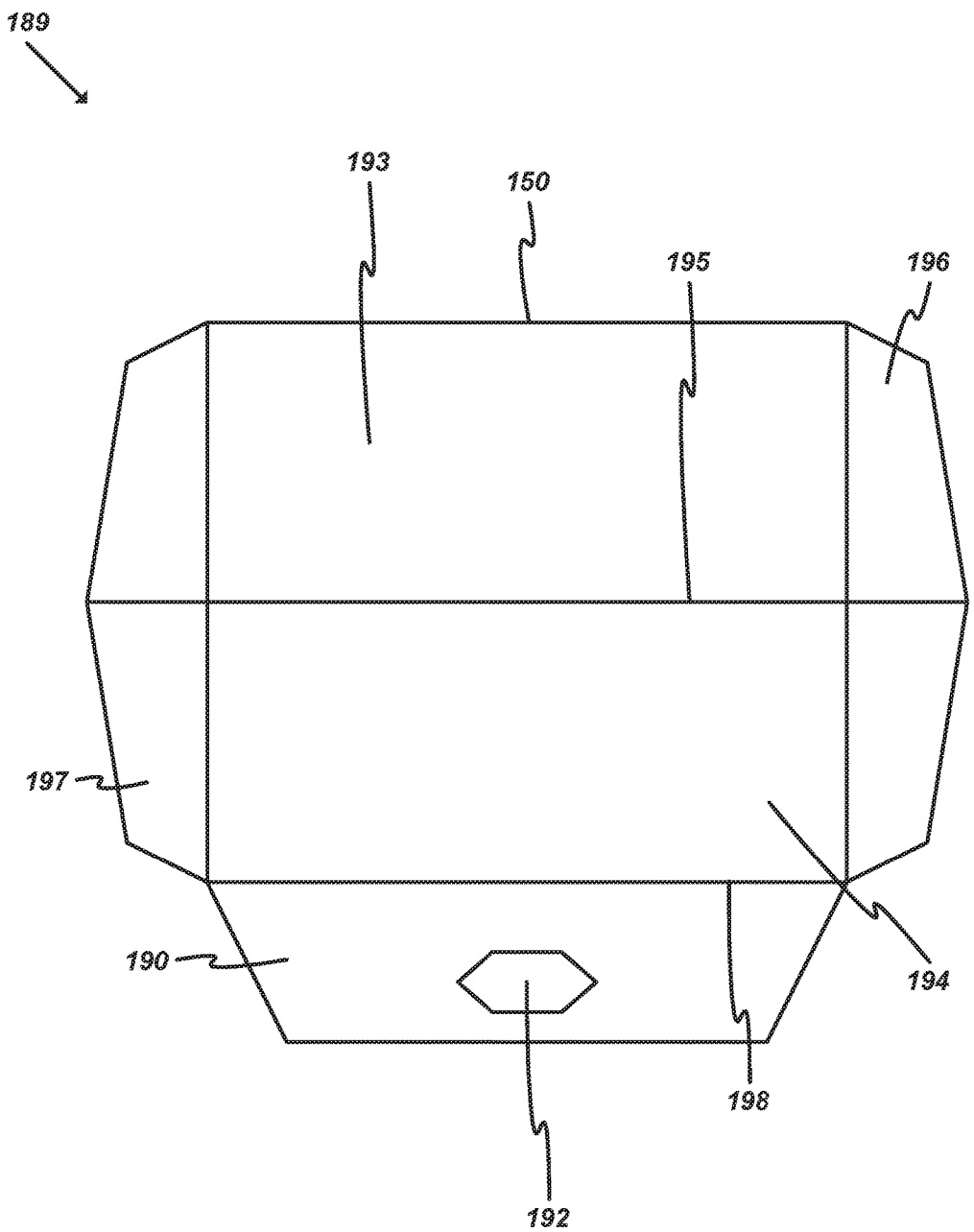
FIG. 1E illustrates a top view of a cover of the foldable food storage container of FIG. 1A.

FIG. 1E illustrates a top view of a foldable food storage container cover 189 according to an exemplary embodiment. As shown, the cover 189 may include fold line 150, front tab 190, fastening element 192, cover panel 193, cover panel 194, fold line 195, right side tab 196, left side tab 197, and fold line 198. Cover panel 193 of cover 189 may connect to back panel 105 of container 100 via fold line 150. The cover 189 may be closed onto and/or opened from container 100 by folding and/or unfolding across fold line 150, respectively.

In some embodiments, cover panel 193 may include a complementary fastening element to element 192. The combination of fastening elements may allow the container to retain a folded or flattened state.

During use, front tab 190, right tab 196, and left tab 197 may be used to secure the cover 189 to container 100 when in a fully-expanded state. Front tab 190 may fasten to front panel 115 via fastening element 192. Right side tab 196 may attach to right panels 135, 140, and 145, and left side tab 197 may attach to left side panels 120, 125, and 130.

Figure 1F:
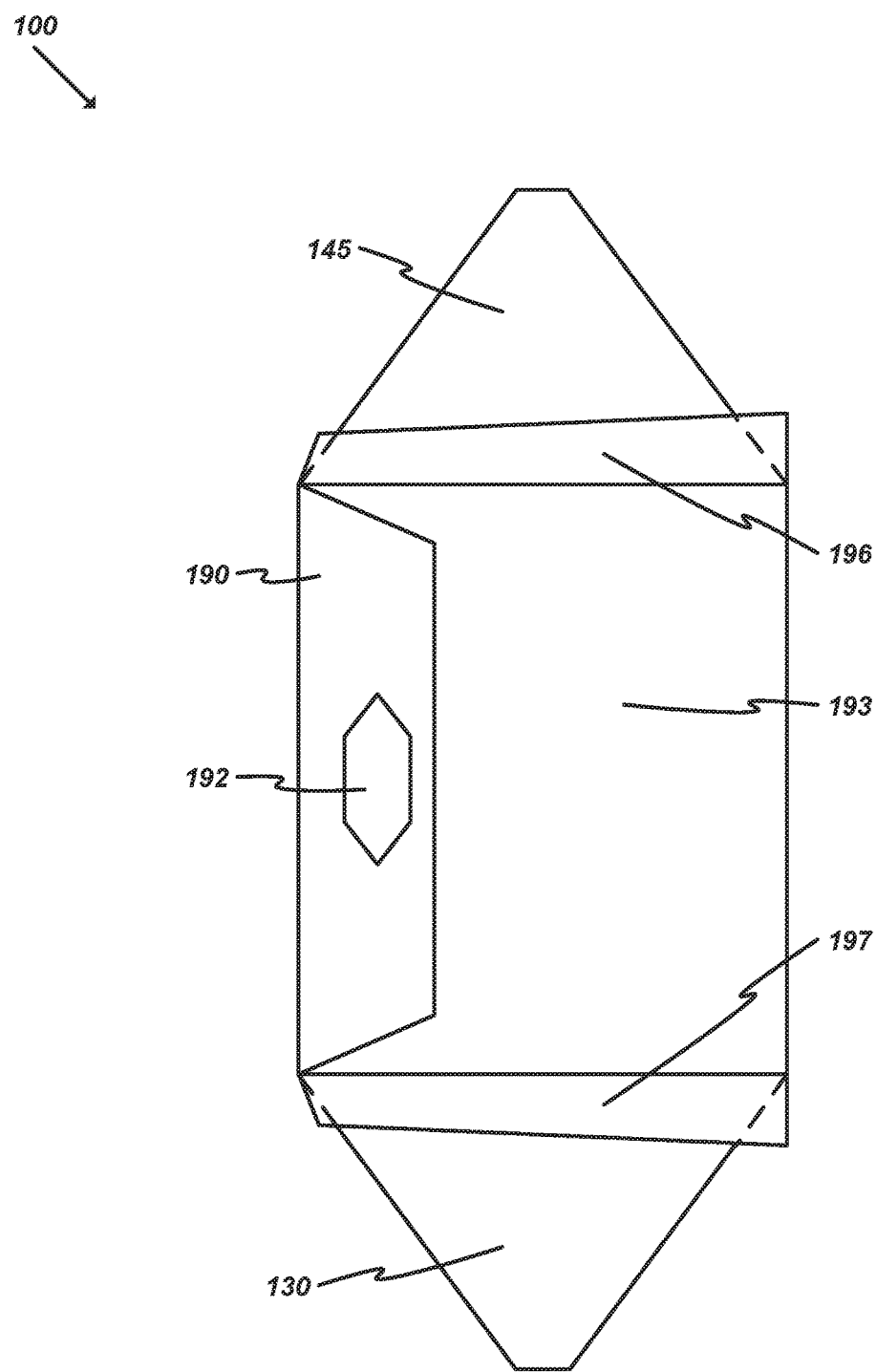
FIG. 1F illustrates a top view of the foldable food storage container of FIG. 1A in a fully-folded state.

FIG. 1F illustrates a top view of the foldable food storage container 100 in a fully-folded state. As shown, container 100 may include left side panel 130, right side panel 145, front tab 190, fastening element 192, cover panel 193, right tab 196, and left tab 197. In the folded state, the front tab 190 may fold onto cover panel 193. Container 100 may include various fold lines over which different panels may be folded to place the container in the state shown in FIG. 1F. The process of opening and folding the container 100 is described in more detail below in reference to FIG. 2 and FIG. 3, respectively.

Figure 2:
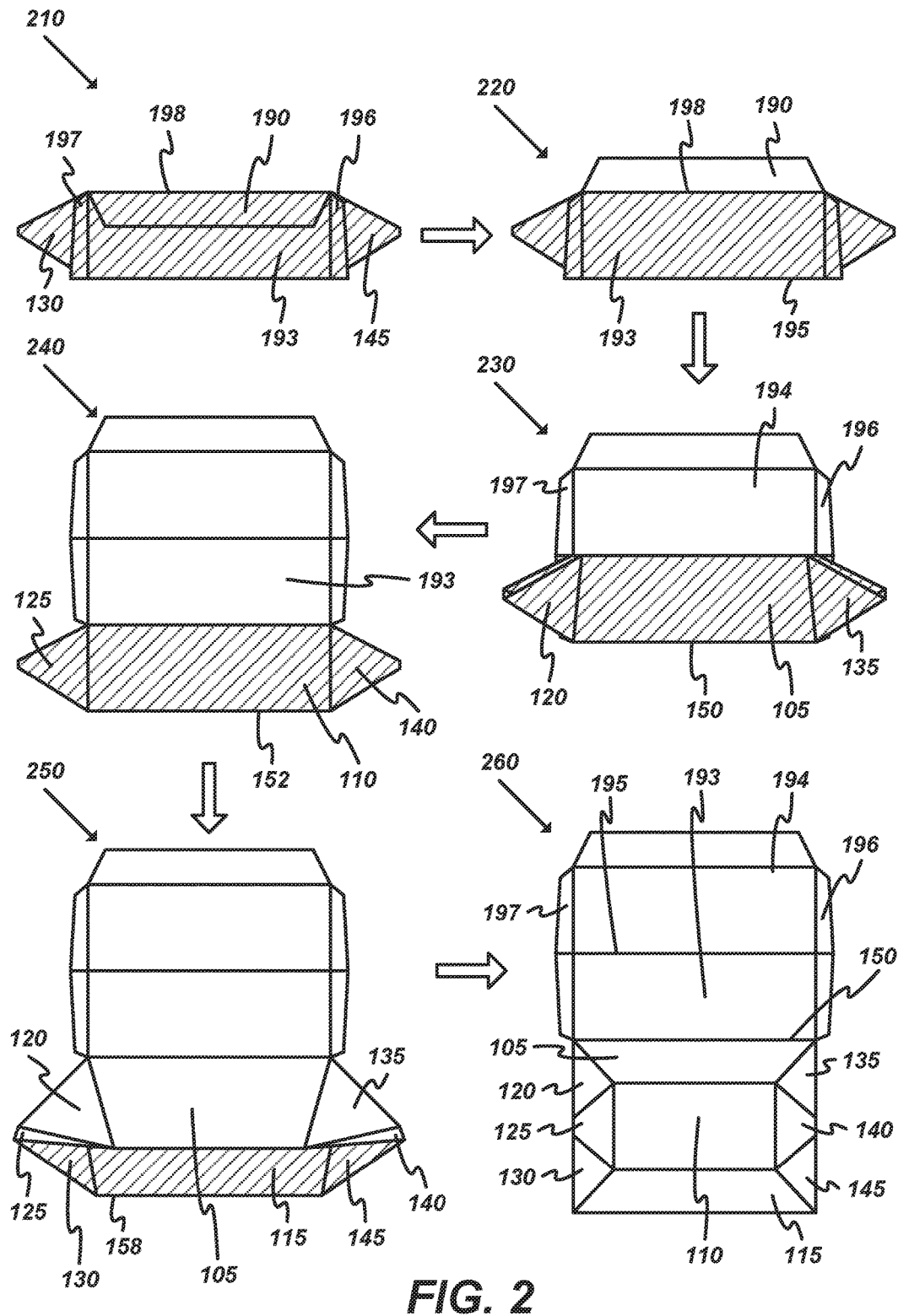
FIG. 2 illustrates front views of an exemplary food storage container at various stages of being expanded from a folded state.

FIG. 2 illustrates front views of the exemplary food storage container 100 at various stages of being expanded from a folded state. The panels of the food storage container may be moved relative to each other along one or more fold lines. Each fold line may generally allow the two panels joined at the fold line to be positioned at a range of angles relative to each other. For instance, when the container is folded into a flattened state, various panels may be positioned along the fold lines such that one face of each panel is in contact with a face of the adjoining panel and the associated fold line has an acute angle approaching zero between the panels. Other panels may be positioned essentially flat relative to adjoining panels (e.g., the side panels in an open position) such that the angle along the fold line approaches one hundred eighty degrees. In some cases, the angle may exceed one hundred eighty degrees in certain configurations (e.g., the lid may be folded away from the food storage area when the container is used to serve food).

As shown, container 100 may begin in a fully-folded configuration 210, with the outer portion of left panel 130, right panel 145, front tab 190, cover panel 193, right side tab 196, and left side tab 197 facing upwards in this example. Areas with a fill pattern represent the outer surface (or "side" or "face") of the panels or flaps, while areas with no fill represent the interior face of the panels or flaps. In this example, the terms "inside", "inner", and/or "interior" may be used to refer to elements of the container 100 that would generally contact food (or be adjacent to such areas, as in the case of the lid flap 190). Likewise, the terms "outside", "outer", and/or "exterior" may be used to refer to elements of the container 100 that are opposite the inside faces and would not contact food.

Front tab 190 may be unfolded along fold line 198, revealing the inner side of front tab 190 in configuration 220. Container 100 may be converted to configuration 230 by unfolding cover panel 193 along fold line 195, revealing the outer face of back panel 105, left panel 120, right panel 135, and the inner side of cover panel 194, right tab 196, and left tab 197.

Panels 105, 120, and 135 may then be unfolded along fold line 150 to convert container 100 to configuration 240, revealing the outer side of bottom panel 110, left medial panel 125, and right medial panel 140, and the inner side of cover panel 193.

Bottom panel 110, left panel 125, and right panel 140 may be partially unfolded along fold lines 152, 172, and 182 to convert container 100 to configuration 250, revealing the inner side of back panel 105, left panels 120 and 125, right panels 135 and 140, and the outer side of front panel 115, left panel 130, and right panel 145.

Next, bottom panel 110, front panel 115, and side panels 130 and 145 may be unfolded along fold lines 158, 176, and 188, respectively, in order to convert container 100 to the fully-opened configuration 260. As shown, configuration 260 may expose the inner surfaces of the food storage area of container 100, including back panel 105, bottom panel 110, front panel 115, left side panels 120, 125, and 130, and right side panels 135, 140, and 145. Configuration 260 also shows the inner side of cover 189, including front tab 190, cover panels 193 and 194, right side tab 196, and left side tab 197. During use, cover 189 may be folded along fold line 150 to completely cover container 100, and thereby be used to enclose food and/or liquids in the food storage area of the container 100.

Figure 3:
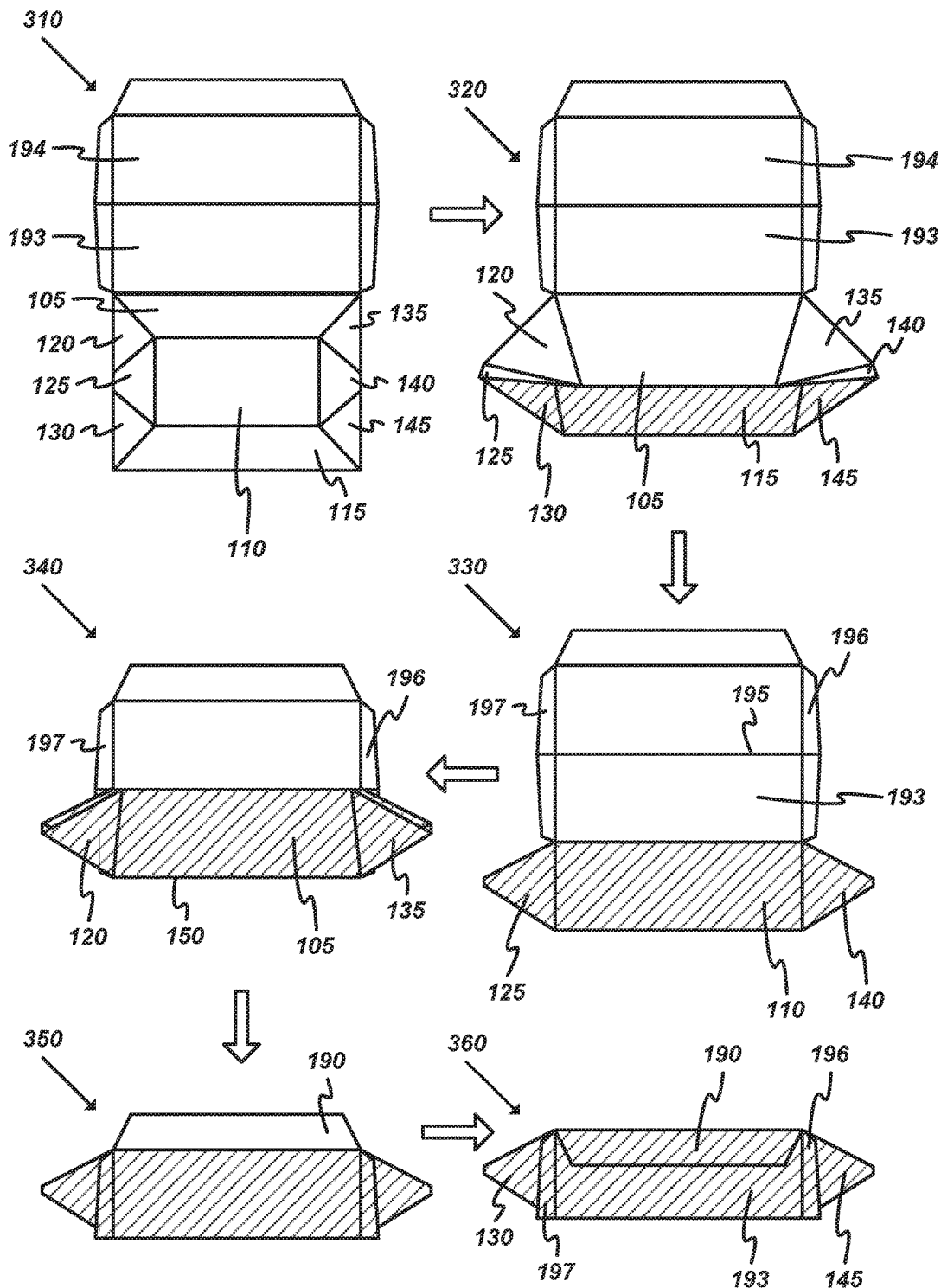
FIG. 3 illustrates front views of an exemplary food storage container at various stages of being folded from an expanded state.

FIG. 3 illustrates front views of the exemplary food storage container 100 at various stages of being folded from an expanded state. The stages illustrated in folding container 100 are complementary and in reverse order to the stages illustrated in FIG. 2 of expanding container 100 from a folded state. As shown, container 100 may begin in a fully-expanded configuration 310. Configuration 310 may correspond to configuration 260 described above.

The front panel 115 may be folded inwards towards bottom panel 110 along fold line 158 to achieve a partially flattened configuration 320. In addition, side front panels 130 and 145 may be folded toward side medial panels 125 and 140 along fold lines 176 and 188, respectively. In this state, the inside (or "interior") face of front panel 115 may be in contact with the inside face of bottom panel 110, while the inside faces of side front panels 130 and 145 may be in contact with the inside faces of side medial panels 125 and 140.

In configuration 330, the front panel 115 and bottom panel 110 are folded toward the back panel 105 along fold line 152. In addition, side medial panels 125 and 140 may be folded toward side rear panels 120 and 135 along fold lines 172 and 182, respectively. In state 330, the outside (or "exterior") face of the front panel 115 may be in contact with the inside face of the rear panel 105, while the outside face of the bottom panel 110 and the outside faces of side medial panels 125 and 140 are exposed. In addition, the outside faces of side front panels 130 and 145 may be in contact with the inside faces of side rear panels 120 and 135, respectively.

In state 340, the food storage area panels are folded toward cover panel 193 along fold line 150. In this configuration 340, the outside face of bottom panel 110 may be in contact with the inside face of panel 193. In addition, the portions of the inside faces of side tabs 196 and 197 corresponding to panel 193 may be in contact with the outside faces of side medial panels 125 and 140, respectively.

As shown in configuration 350, the flattened food storage area panels and cover panel 193 may be folded toward cover panel 194 along fold line 195. In this state 350, the outside face of rear panel 105 may be in contact with the inside face of cover panel 194 and the portions of the inside faces of side tabs 196 and 197 corresponding to panel 194 may be in contact with the outsides of side rear panels 120 and 135, respectively.

In the folded state 360, the front tab 190 may be folded toward cover panel 193 along fold line 150. In this configuration 360, the inside face of tab 190 may be in contact with the outside face of panel 193. Configuration 360 may correspond to configuration 210 described above.

In some embodiments, the fastening element 192 may include complementary elements located on lid panel 190 and lid panel 193 that may be selectively coupled or uncoupled to retain or release, respectively, the container 100 from the folded state 360.

The example folded state 360 may provide the thinnest or "flattest" configuration possible (i.e., the folded state with the fewest number of panels stacked against other panels). Various alternative folded states may likewise be achieved by manipulating the positions of the panels along the fold lines. For instance, the side panels 120-145 may be folded inwardly such that at configuration 330, the side panels would be stacked between the rear panel 105 and the bottom panel 110. Such a variation would provide a relatively thicker folded state that may be less wide than state 360. Similarly, flaps 196 and 197 may be folded inwardly at state 330 in order to reduce the width of the folded state 360 at the expense of added thickness in some places.

Figure 4:
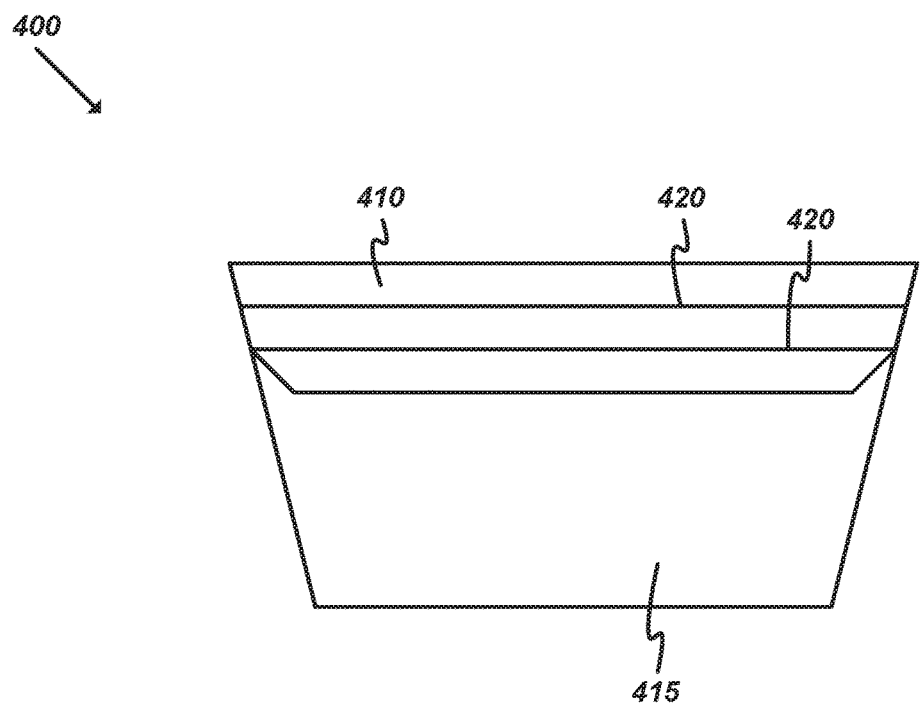
FIG. 4 illustrates a front view of an exemplary foldable food storage container with an alternative front tab.

FIG. 4 illustrates a front view of an exemplary foldable food storage container 400 with an alternative front tab. As shown, the container may include a front tab 410, front panel 415, and fold lines 420. Fold lines 420 may allow the container 400 to be secured in various positions. For example, each fold line 420 may correspond to a different flattened state with a different thickness.

The front panel may also include a fastening element (omitted for clarity) such as element 192 described above in reference to container 100. Front panel 415 may be similar to front panel 115 of container 100, described above. Likewise, the various other elements of container 400 may be similar to the corresponding elements of container 100.

Figure 5:
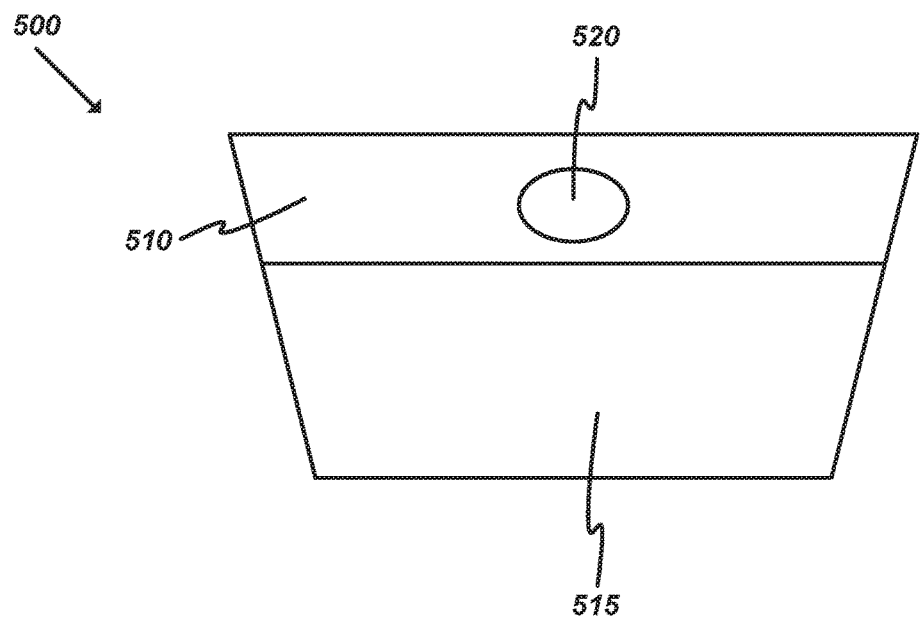
FIG. 5 illustrates a front view of an exemplary foldable food storage container with another alternative front tab.

FIG. 5 illustrates a front view of an exemplary foldable food storage container 500 with another alternative front tab. As shown, the container may include a front tab 510, front panel 515, and fastening element 520. The front tab 510 may include a fastening element 520 able to fasten to a complementary fastening element located on front panel 515 when container 500 is in an expanded state. Different embodiments may include various different fastening elements 520. The fastening element may include various appropriate components such as snaps, hook and loop fasteners, slot and tab closures, elastic loop and knob fasteners, drawstrings, ties, clips, pins, latches, etc. The fastening element may allow the flap 510 to be selectively coupled to the front panel 515. Some embodiments may include fastening elements at other locations (e.g., along the sides of the lid, at different points along the flap, etc.).

Different embodiments may include various other types of front tabs. For example, while front tab 510 is shown being even with the edges of front panel 515, FIG. 1C includes a front tab 190 that may be slightly indented from the edges of front panel 115. Other embodiments may include front tabs with other indentations, widths, and/or lengths, as appropriate.

Figure 6A:
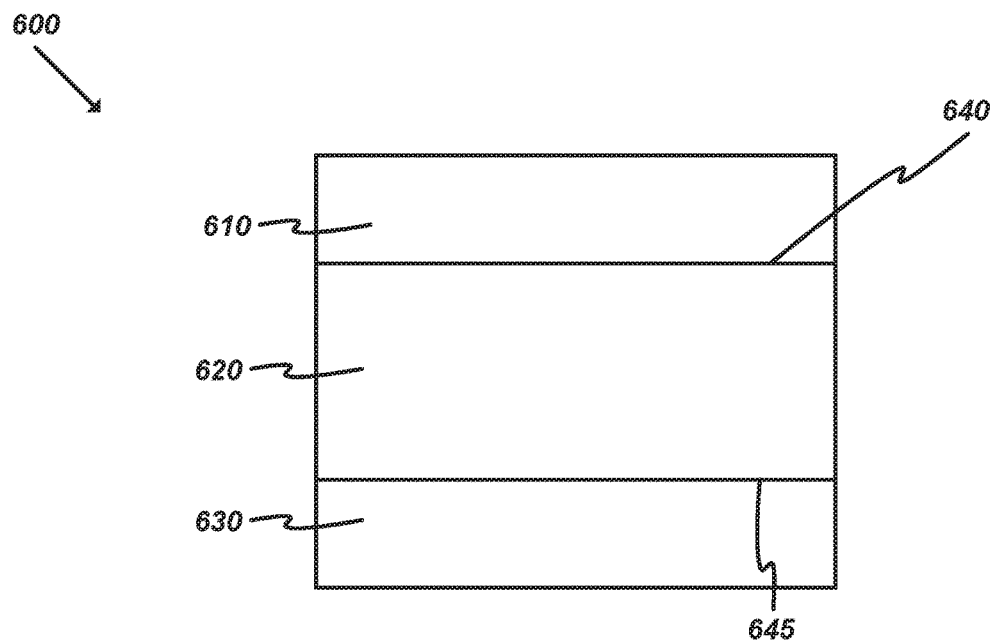
FIG. 6A illustrates a top view of an alternative foldable food storage container according to an exemplary embodiment in an expanded state.
Figure 6B:
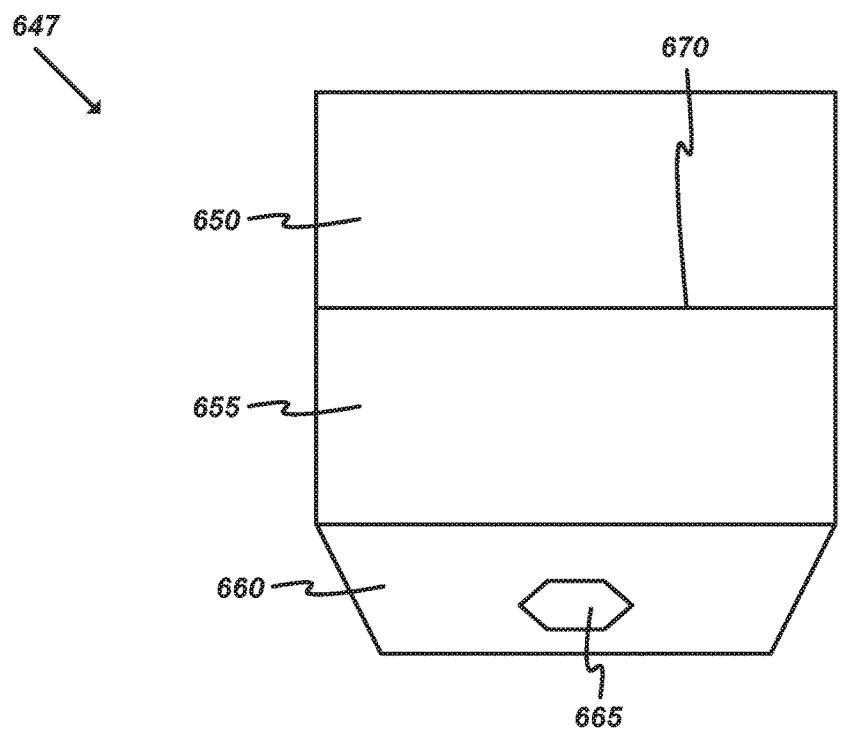
FIG. 6B illustrates a top view of the alternative foldable food storage container of FIG. 6A in an expanded state.
Figure 6C:
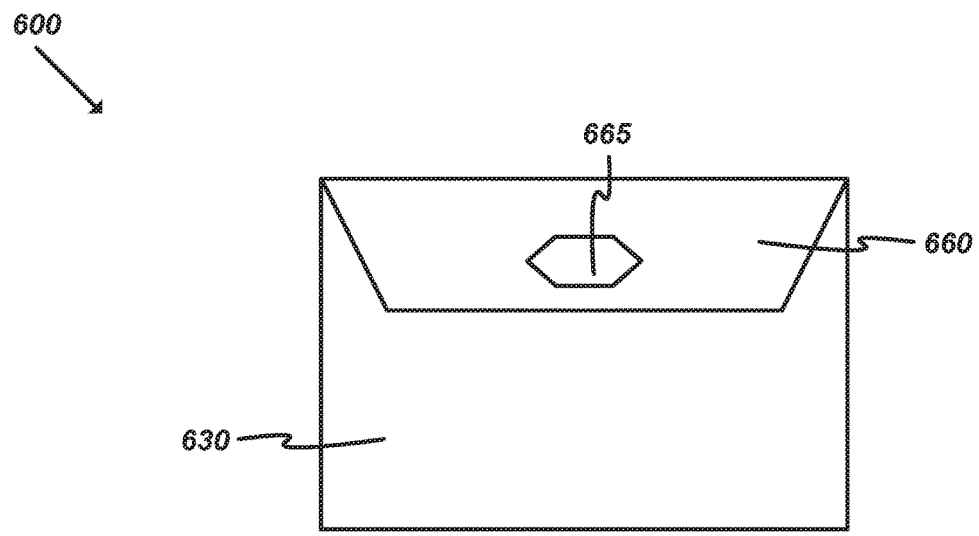
FIG. 6C illustrates a front view of the alternative foldable food storage container of FIG. 6A in an expanded and covered state.
Figure 6D:
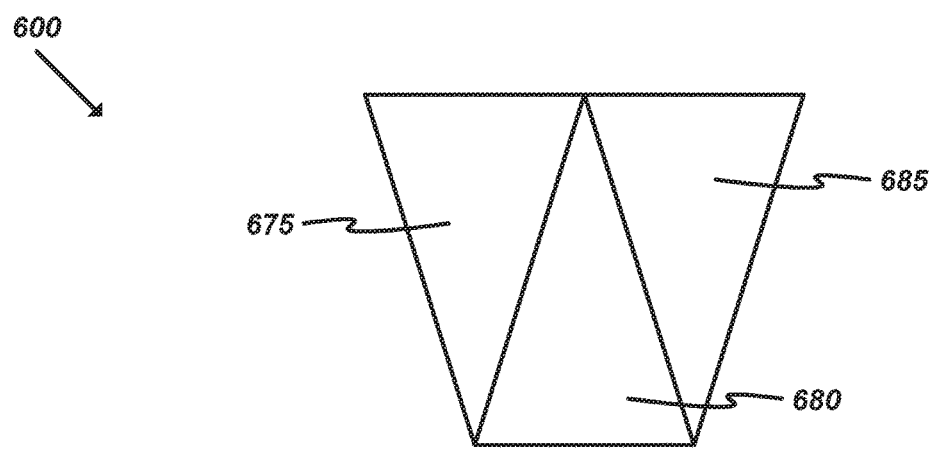
FIG. 6D illustrates a side view of an expanded alternative foldable food storage container according to an exemplary embodiment.
Figure 6E:
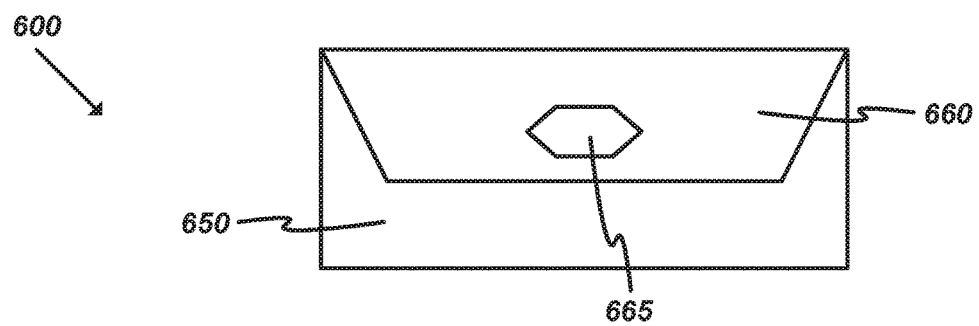
FIG. 6E illustrates a top view of the alternative foldable food storage container of FIG. 6A in a folded state.

FIG. 6A illustrates a top view of an expanded alternative foldable food storage container 600 according to an exemplary embodiment. In this example, the cover is omitted for clarity. FIG. 6B illustrates a top view of an expanded alternative foldable food storage container cover 647 according to an exemplary embodiment. FIG. 6C illustrates a front view of the alternative foldable food storage container 600 in an expanded and covered state. FIG. 6D illustrates a side view of the alternative foldable food storage container 600 in an expanded state. FIG. 6E illustrates a top view of the alternative foldable food storage container 600 in a folded state. As shown, the container 600 may include a back panel 610, bottom panel 620, front panel 630, fold lines 640 and 645, side panels 675, 680, and 685, and a cover 647, including cover panels 650 and 655, front tab 660, fastening element 665, and fold line 670.

The front tab 660 of cover 647 may include a fastening element 665, which may fasten to a complementary fastening element on the outer face of the front panel 630 when container 600 is in a fully expanded state. The container 600 may include fold lines 640, 645 and 670 that may allow the container 600 to convert from an expanded to a folded state and vice versa.

Figure 7A:
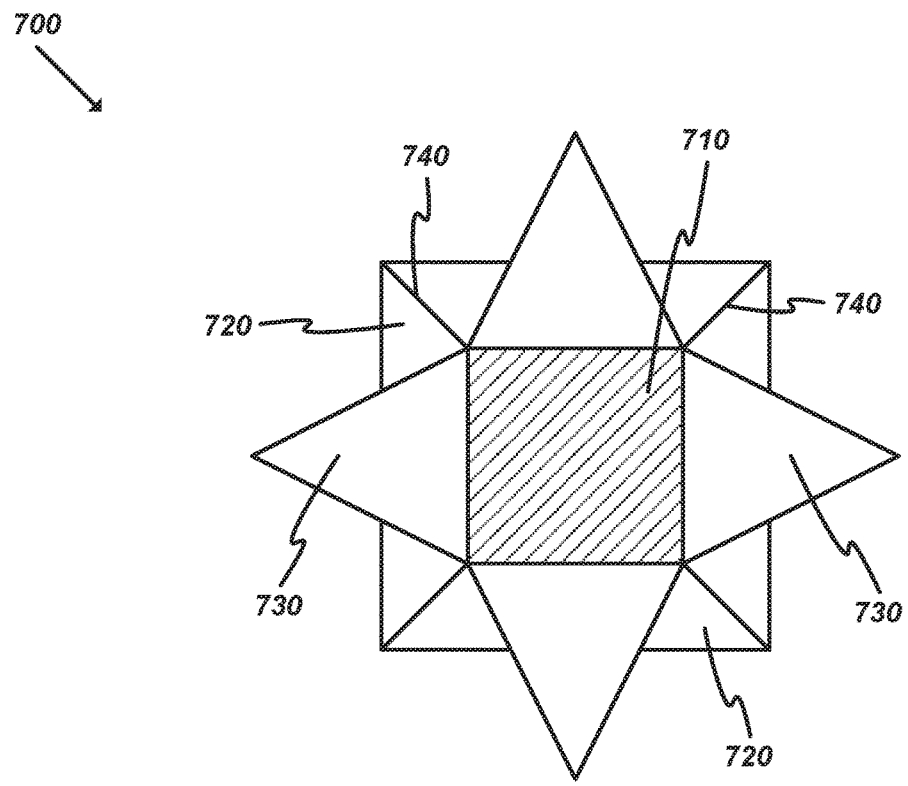
FIG. 7A illustrates a top view of a pyramid shaped foldable food storage container according to an exemplary embodiment.
Figure 7B:
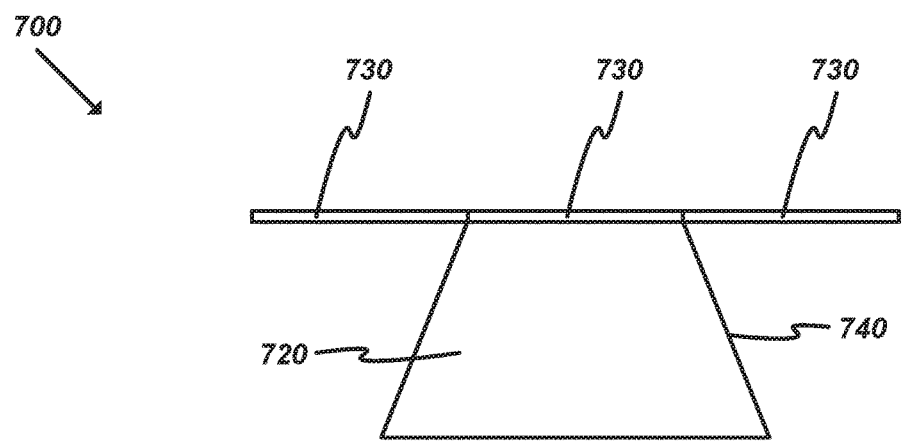
FIG. 7B illustrates front, side, or rear views of the pyramid shaped foldable food storage container of FIG. 6A.

FIG. 7A illustrates a top view of a pyramid shaped foldable food storage container 700 according to an exemplary embodiment. FIG. 7B illustrates front, side, or rear views of the pyramid shaped foldable food storage container 700. As shown, the container may include a main food storage area 710, side panels 720, triangular cover sections 730, and fold lines 740. Food and/or liquids may be placed in or taken out of the main food storage area 710 when the triangular cover sections 730 are in an open configuration, as shown in FIGS. 7A-7B. The side panels 720 may be folded and unfolded along fold lines 740 to convert container 700 from a folded state to an expanded state and vice versa.

Figure 8A:
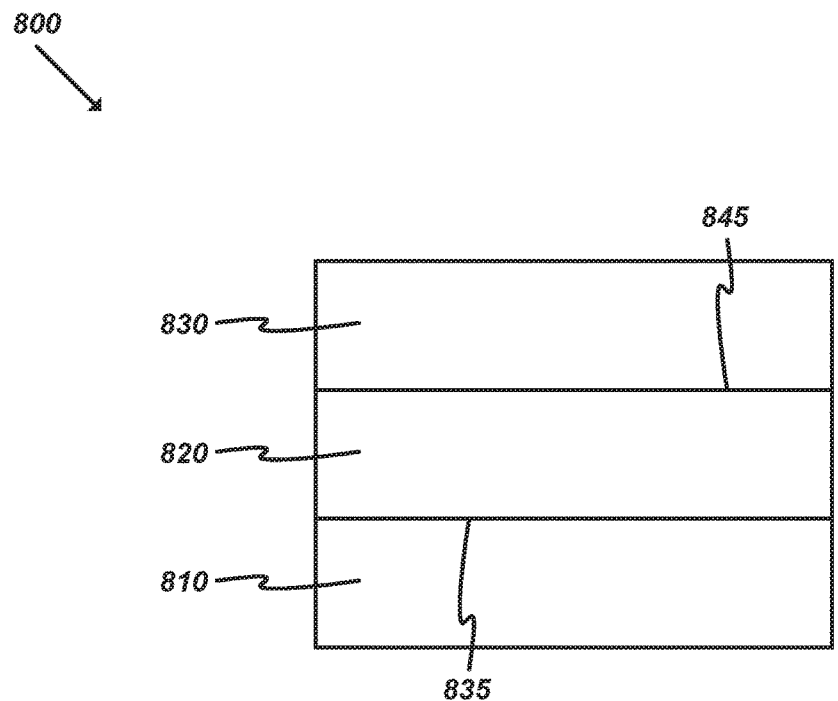
FIG. 8A illustrates a front view of a hexagonal foldable food storage container according to an exemplary embodiment.
Figure 8B:
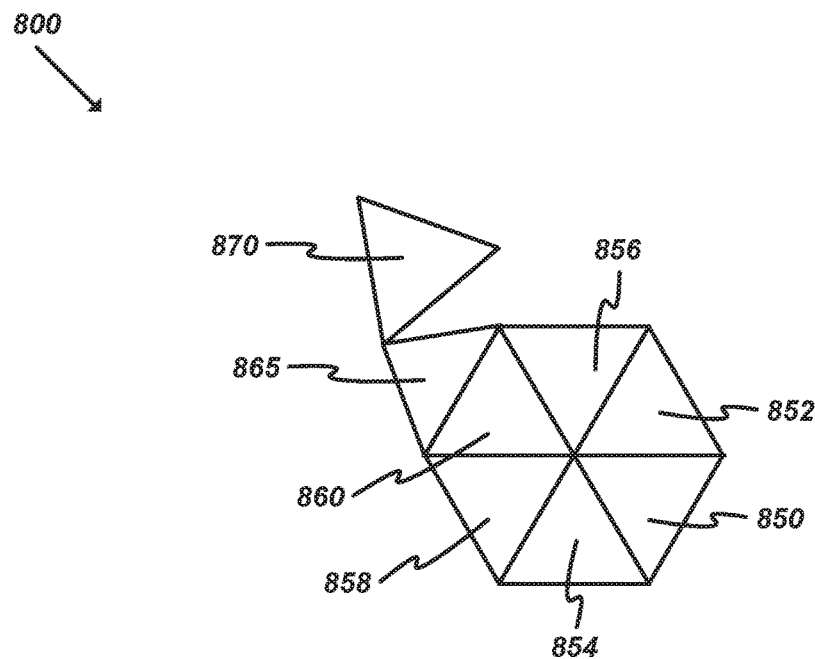
FIG. 8B illustrates a side view of the hexagonal foldable food storage container of FIG. 8A.

FIG. 8A illustrates a front view of a hexagonal foldable food storage container 800 according to an exemplary embodiment. FIG. 8B illustrates a side view of the hexagonal foldable food storage container 800. As shown, the container 800 may include front bottom panel 810, front top panel 820, front cover panel 830, fold lines 835 and 845, side panels 850-860, side attachment panel 865, and side cover panel 870. The front bottom panel 810 may attach to side panel 850 and the front top panel 820 may attach to side panel 852. The front cover panel 830 may attach to the side cover panel 870.

The front view of FIG. 8A shows the outer side of front bottom panel 810 and front top panel 820, and shows the inner side of cover panel 830 in an open configuration. To convert the container 800 into an expanded and closed state, the cover panel 830 may be folded along fold line 845, side attachment panel 865 may be folded inwards towards container 800, and side cover panel 870 may be folded down towards side panel 856. Container 800 may utilize numerous other panels and fold lines to convert from a folded state to an expanded state and vice versa.

Figure 9A:
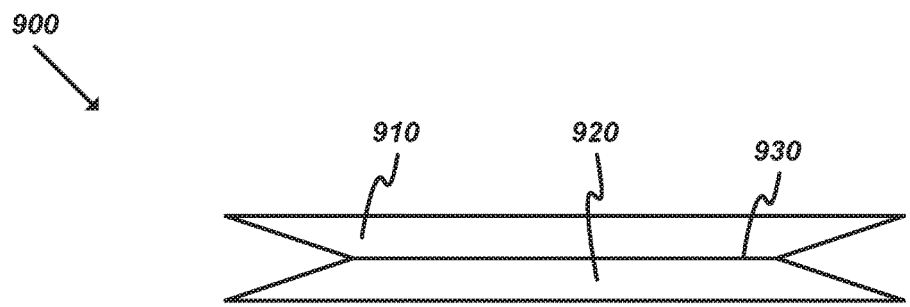
FIG. 9A illustrates a front view of a rectangular foldable food storage container in a nearly-folded state according to an exemplary embodiment.
Figure 9B:
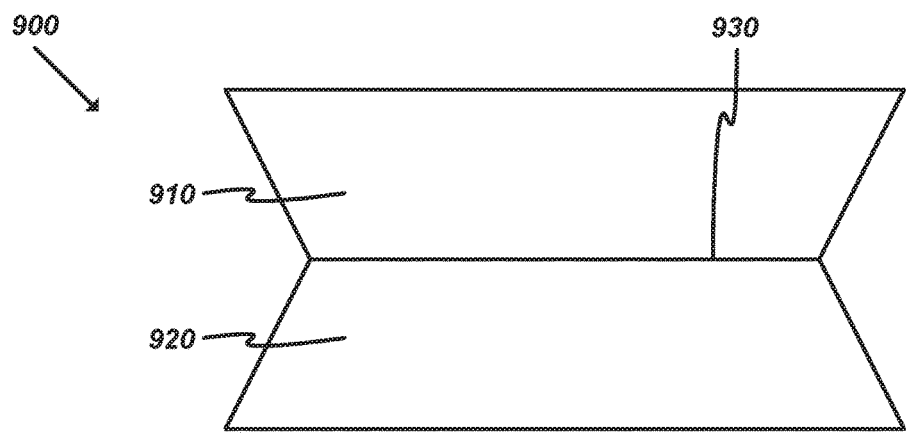
FIG. 9B illustrates a front view of the rectangular foldable food storage container of FIG. 9A in a half-folded state.
Figure 9C:
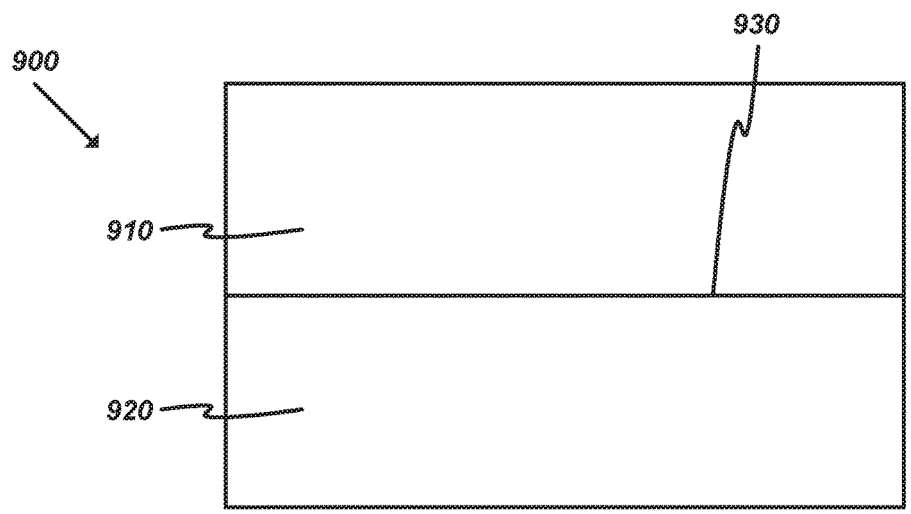
FIG. 9C illustrates a front view of the rectangular foldable food storage container of FIG. 9A in a fully-expanded state.

FIG. 9A illustrates a front view of a rectangular foldable food storage container 900 in a nearly-folded state according to an exemplary embodiment. FIG. 9B illustrates a front view of the rectangular foldable food storage container 900 in a half-folded state. FIG. 9C illustrates a front view of the rectangular foldable food storage container 900 in a fully-expanded state. As shown in FIGS. 9A-9C, container 900 may include a front top panel 910, front bottom panel 920, and fold line 930. The front top panel 910 and front bottom panel 920 may be folded and unfolded across fold line 930 to expand and collapse container 900 as needed, from its nearly-folded state of FIG. 9A to its fully-expanded state of FIG. 9C and vice versa.

Figure 10A:
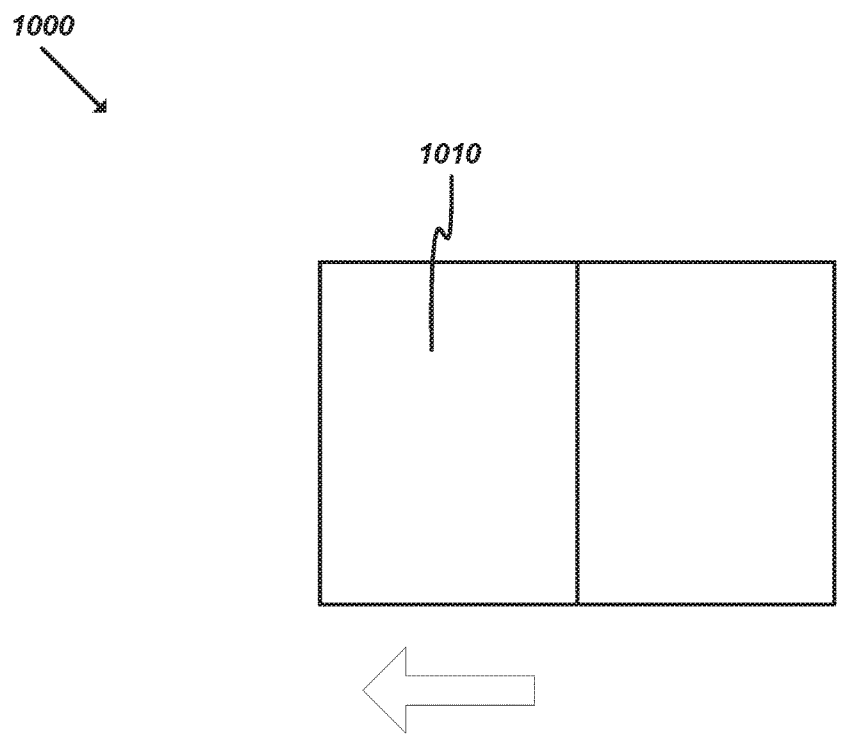
FIG. 10A illustrates a top view of a rectangular foldable food storage container with a slide-door feature in a closed state according to an exemplary embodiment.
Figure 10B:
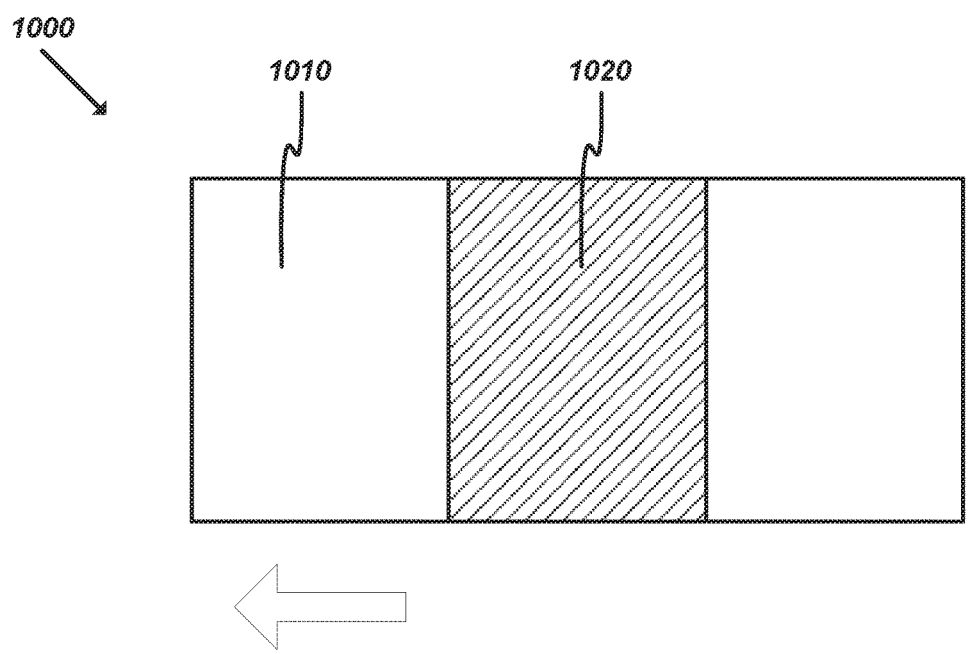
FIG. 10B illustrates a top view of the rectangular foldable food storage container of FIG. 10A in an open state.
Figure 10C:
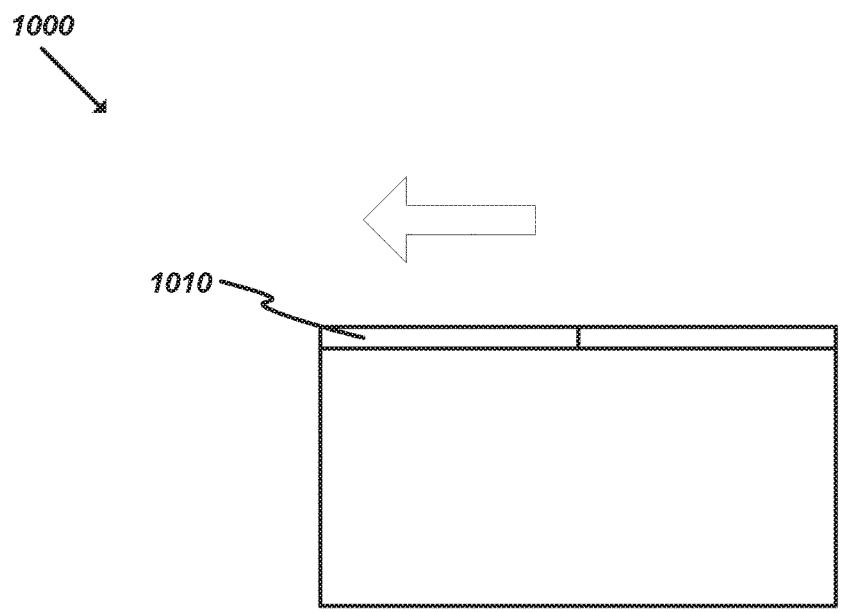
FIG. 10C illustrates a front view of the rectangular foldable food storage container of FIG. 10A in a closed state.
Figure 10D:
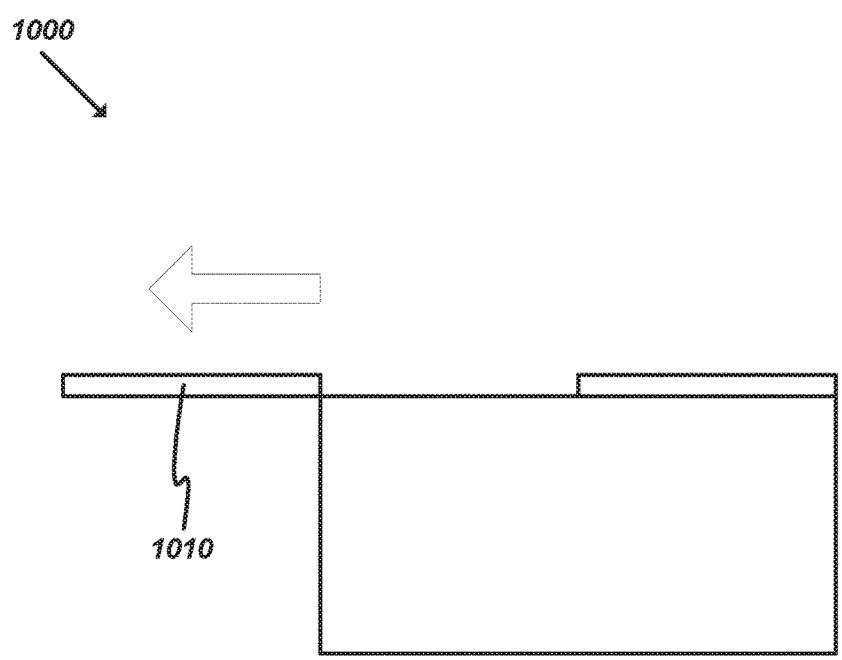
FIG. 10D illustrates a front view of the rectangular foldable food storage container of FIG. 10A in an open state.

FIG. 10A illustrates a top view of a rectangular foldable food storage container 1000 with a slide-door feature in a closed state according to an exemplary embodiment. FIG. 10B illustrates a top view of the rectangular foldable food storage container 1000 with a slide-door feature in an open state. FIG. 10C illustrates a front view of the rectangular foldable food storage container 1000 with a slide-door feature in a closed state. FIG. 10D illustrates a front view of the rectangular foldable food storage container 1000 with a slide-door feature in an open state. As shown, slide-door 1010 may be moved from the closed position in FIG. 10A and FIG. 10C to the open position in FIG. 10B and FIG. 10D. Area 1020 indicates the bottom of the main food storage area of container 1000 when slide-door 1010 is in an open position. While FIGS. 10A-10D show container 1000 with a single slide-door 1010, other embodiments may have two or more slide doors to cover container 1000.

Figure 11A:
FIG. 11A illustrates a top view of an interior frame for a foldable food storage container according to an exemplary embodiment.
Figure 11B:
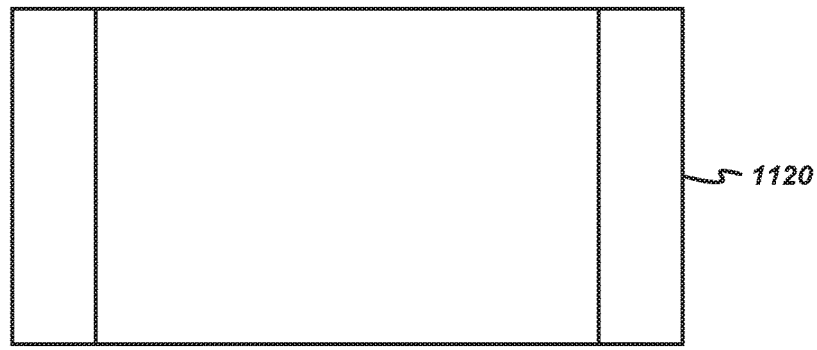
FIG. 11B illustrates a front view of the interior frame of FIG. 11A.
Figure 11C:
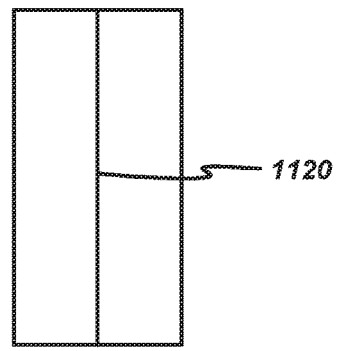
FIG. 11C illustrates a side view of the interior frame of FIG. 11A.

FIG. 11A illustrates a top view of an interior frame 1100 for a foldable food storage container according to an exemplary embodiment. FIG. 11B illustrates a front view of the interior frame 1100 for a foldable food storage container. FIG. 11C illustrates a side view of the interior frame 1100 for a foldable food storage container.

As shown, frame 1100 may have rounded ends 1110 and end support segments 1120 for structural support. The frame 1100 may have an adjustable height and/or width. The frame may be used in conjunction with a drawstring bag and/or other types of covers to allow for the storage and transportation of food. For example, a drawstring bag may be placed around frame 1100 and tightened to provide a food storage container.

The foregoing relates to illustrative details of exemplary embodiments and modifications may be made without departing from the scope of the disclosure as defined by the following claims.

I claim:

1. A foldable food storage and serving container comprising:
   a bottom panel;
   a left side panel coupled to the bottom panel along a left side fold line;
   a right side panel coupled to the bottom panel along a right side fold line, wherein the left side panel and the right side panel each comprise a side front panel, a side medial panel coupled to the bottom panel and coupled to the side front panel along a front side fold line, and a side rear panel coupled to the side medial panel along a rear side fold line;
   a rear panel coupled to the bottom panel along a back fold line;
   a front panel coupled to the bottom panel along a front fold line; and
   a lid comprising:
      a first cover panel coupled to the back panel along a lid fold line;
      a second cover panel coupled to the first cover panel along a medial fold line, wherein the medial fold line is parallel to the lid fold line; and
      a flap coupled to the second cover panel along a flap fold line, wherein the flap fold line is parallel to the lid fold line and the medial fold line and the flap comprises a fastening element that is able to be coupled to the front panel in an expanded state and coupled to the first cover panel in a flattened state.

2. The foldable food storage and serving container of claim 1, wherein the bottom panel is rectangular.

3. The foldable food storage and serving container of claim 1, wherein the left side panel, right side panel, rear panel, and front panel are trapezoidal.

4. The foldable food storage and serving container of claim 1, wherein the side front panels and side rear panels are triangular.

5. The foldable food storage and serving container of claim 1, wherein the side medial panels are trapezoidal.

6. The foldable food storage and serving container of claim 1, wherein the food storage container is able to fold into a flattened state wherein at least one face of each panel contacts a face of at least one other panel and an expanded state wherein each face of each panel is not in contact with any other face of any other panel.

7. The foldable food storage and serving container of claim 1, wherein the food storage container is able to change from the flattened state to the expanded state or change from the expanded state to the flattened state by repositioning at least one panel relative to at least one other panel by changing an angle along a fold line between the at least one panel and the at least one other panel.

8. A storage and serving container comprising:
   a plurality of planar elements including:
      a rectangular bottom panel;
      a trapezoidal front panel;
      a trapezoidal rear panel;
      a triangular left side front panel;
      a trapezoidal left side medial panel;
      a triangular left side rear panel;
      a triangular right side front panel;
      a trapezoidal right side medial panel;
      a triangular right side rear panel;
      a rectangular rear lid panel;
      a rectangular front lid panel;
      a mirrored trapezium left side lid tab;
      a mirrored trapezium right side lid tab; and
      a trapezoidal front lid tab;
   a plurality of scored fold lines that couple the plurality of planar elements together; and
   a re-sealable fastening element that selectively couples and decouples the front lid tab from the front panel in an expanded state and selectively couples and decouples the front lid tab from the rear lid panel in a flattened state.

9. The storage and serving container of claim 8, wherein each of the plurality of planar elements is coupled to at least one other planar element from the plurality of planar elements along a scored fold line from among the plurality of scored fold lines.

10. A foldable food storage container comprising:
a main storage compartment comprising:
- a trapezoidal rear panel;
- a rectangular bottom panel coupled to the rear panel along a first fold line;
- a trapezoidal front panel coupled to the bottom panel along a second fold line;
- a left side rear panel coupled to the rear panel along a third fold line;
- a left side medial panel coupled to the left side rear panel along a fourth fold line and to the bottom panel along a fifth fold line;
- a left side front panel coupled to the left side medial panel along a sixth fold line and to the front panel along a seventh fold line;
- a right side rear panel coupled to the rear panel along an eighth fold line;
- a right side medial panel coupled to the right side rear panel along a ninth fold line and to the bottom panel along a tenth fold line;
- a right side front panel coupled to the right side medial panel along an eleventh fold line and to the front panel along a twelfth fold line; and a lid comprising:
- a rectangular rear lid panel coupled to the rear panel along a thirteenth fold line;
- a rectangular front lid panel coupled to the rear lid panel along a fourteenth fold line;
- a mirrored trapezium left side lid tab coupled to the rear lid panel and the front lid panel along a fifteenth fold line;
- a mirrored trapezium right side lid tab coupled to the rear lid panel and the front lid panel along a sixteenth fold line; and
- a trapezoidal front lid tab coupled to the front lid panel along a seventeenth fold line.

11. The foldable food storage container of claim 10, wherein the first fold line, the second fold line, the thirteenth fold line, the fourteenth fold line, and the seventeenth fold line are parallel to each other and wherein the fifth fold line, the tenth fold line, the fifteenth fold line, and the sixteenth fold line are perpendicular to the first fold line.

* * * * *